US012338597B2

(12) United States Patent
Currey

(10) Patent No.: US 12,338,597 B2
(45) Date of Patent: Jun. 24, 2025

(54) VIBRATORY COMPACTOR

(71) Applicant: Albert Ben Currey, Phoenix, AZ (US)

(72) Inventor: Albert Ben Currey, Phoenix, AZ (US)

( * ) Notice: Subject to any disclaimer, the term of this patent is extended or adjusted under 35 U.S.C. 154(b) by 0 days.

(21) Appl. No.: 18/463,701

(22) Filed: Sep. 8, 2023

(65) Prior Publication Data

US 2023/0417006 A1 Dec. 28, 2023

Related U.S. Application Data

(63) Continuation-in-part of application No. 17/660,159, filed on Apr. 21, 2022, now Pat. No. 11,773,556, which is a continuation-in-part of application No. 17/647,241, filed on Jan. 6, 2022, now Pat. No. 11,447,922, which is a continuation-in-part of application No. 17/397,369, filed on Aug. 9, 2021, now Pat. No. 11,649,602, which is a continuation of application No. 16/989,373, filed on Aug. 10, 2020, now Pat. No. 11,085,159, which is a continuation of (Continued)

(51) Int. Cl.

| | |
|---|---|
| ***E02D 3/046*** | (2006.01) |
| ***B06B 1/18*** | (2006.01) |
| ***E01C 19/30*** | (2006.01) |
| ***E02F 3/96*** | (2006.01) |
| ***E02F 5/22*** | (2006.01) |

(52) U.S. Cl.

CPC .............. *E02D 3/046* (2013.01); *B06B 1/183* (2013.01); *E01C 19/30* (2013.01); *E02F 3/967* (2013.01); *E02F 5/223* (2013.01); *B06B 2201/73* (2013.01)

(58) Field of Classification Search

CPC .......... E01C 19/30; E01C 19/32; E01C 19/34; E01C 19/35; E02D 3/046

See application file for complete search history.

(56) References Cited

U.S. PATENT DOCUMENTS

| | | | |
|---|---|---|---|
| 3,128,682 A | 4/1964 | Thompson | |
| 3,909,149 A * | 9/1975 | Century | E02D 9/02 173/162.1 |
| 9,926,677 B1 | 3/2018 | Beckhusen et al. | |

(Continued)

FOREIGN PATENT DOCUMENTS

| | | |
|---|---|---|
| CN | 209368918 | 9/2019 |
| JP | H11158860 | 6/1996 |

(Continued)

*Primary Examiner* — Sunil Singh

(74) *Attorney, Agent, or Firm* — Schmeiser, Olsen & Watts LLP

(57) ABSTRACT

A vibratory compactor is provided. The vibratory compactor may include a frame coupled to a compactor plate. The frame and compactor plate are configured to vibrate to compact soil. The vibratory compactor may also include a housing having an inner volume, the housing coupled to the frame by at least one isolator with the frame and the at least one load bearing member located within the inner volume. The housing may be coupled to an arm of an excavator. A gap may be formed between the housing and the frame, wherein the gap between the housing and the frame inhibits movement of the housing with respect to the frame through the housing contacting the frame when excess forces are applied to the housing in an up/down direction, a forward/backward direction, a side-to-side direction, or combinations thereof.

4 Claims, 11 Drawing Sheets

Related U.S. Application Data application No. 16/691,240, filed on Nov. 21, 2019, now Pat. No. 10,738,434.

(56) References Cited

U.S. PATENT DOCUMENTS

| | | | |
|---|---|---|---|
| 9,938,672 | B2 | 4/2018 | Jordan |
| 9,988,770 | B1 | 6/2018 | Jordan |
| 10,738,434 | B1 | 8/2020 | Currey |
| 11,085,159 | B2 | 8/2021 | Currey |
| 2018/0100276 | A1 | 4/2018 | Beckhusen |

FOREIGN PATENT DOCUMENTS

| | | |
|---|---|---|
| KR | 20110111681 | 10/2011 |
| KR | 20150037016 | 4/2015 |

* cited by examiner

VIBRATORY COMPACTOR

CROSS REFERENCE TO RELATED APPLICATION

This application is a continuation-in-part of U.S. patent application Ser. No. 17/660,159, filed Apr. 21, 2022, which is a continuation-in-part of U.S. patent application Ser. No. 17/647,241, filed Jan. 6, 2022, now issued U.S. Pat. No. 11,447,922, issued Sep. 20, 2022, which is a continuation-in-part of U.S. patent application Ser. No. 17/397,369, filed on Aug. 9, 2021, now issued U.S. Pat. No. 11,649,602, issued May 16, 2023, which is a continuation of U.S. patent application Ser. No. 16/989,373, filed on Aug. 10, 2020, now U.S. Pat. No. 11,085,159, issued Aug. 10, 2021, which is a continuation of U.S. patent application Ser. No. 16/691,240, filed on Nov. 21, 2019, now U.S. Pat. No. 10,738,434, issued Aug. 11, 2020, the disclosures of which are incorporated entirely herein by reference.

BACKGROUND OF THE INVENTION

Technical Field

This invention relates generally to a compactor and more particularly to a vibratory compactor for use with excavator type vehicles.

State of the Art

Vibratory plate compactors are designed to compact loose material, such as soil, gravel, small aggregate, asphalt and so forth. Conventional plate compactors include a heavy plate on the bottom of the machine that moves up and down quickly. The combination of rapid impacts, plate weight and impact force the soil underneath to compact or pack together more tightly. These plate compactors can be powered by gas engines or by hydraulic motors. Plate compactors that operate with hydraulic fluid are typically used with excavators or back hoes as an attachment. However, these hydraulic plate compactors are limited in their capability because of the exposed motors, hoses and isolators. These conventional vibratory compactors cannot and should not have excess forces applied by the arm of the excavator or backhoe and are limited in their ability to operate with excess forces in directions of up and down, side to side or forward and backward, but rather these conventional vibratory compactors rest on the surface and the plate performs the compaction function with minimal forces being applied by the excavator or backhoe.

Accordingly, there is a need for an improved vibratory compactor for use with excavator-type vehicles.

SUMMARY OF THE INVENTION

An embodiment includes a vibratory compactor comprising: a frame coupled to a compactor plate, wherein the frame and compactor plate are configured to vibrate; a housing comprising an inner volume, the housing coupled to the frame by at least one isolator with the frame located within the inner volume of the housing, wherein the housing is configured to couple to an arm of an excavator; and a gap between the housing and the frame, wherein the gap between the housing and the frame sets a limit of a range of deflection of the at least one isolator by the housing contacting the frame when excess forces are applied to the housing in an up/down direction, a forward/backward direction, a side-to-side direction, or combinations thereof.

Another embodiment includes a method of use of a vibratory compactor comprising: coupling a vibratory compactor to an excavator, the vibratory compactor comprising: a frame coupled to a compactor plate; a housing comprising an inner volume, the housing coupled to the frame by at least one isolator with the frame located within the inner volume of the housing, wherein the housing is configured to couple to an arm of an excavator; and a gap between the housing and the frame; applying an excess force to the housing in an up/down direction, a forward/backward direction, a side-to-side direction, or combinations thereof; and inhibiting movement of the housing with respect to the frame through the housing contacting the frame in response to the compactor plate or frame being restricted while moving the vibratory compactor, the movement of the housing with respect to the frame being limited by a size of the gap between the housing and the frame.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
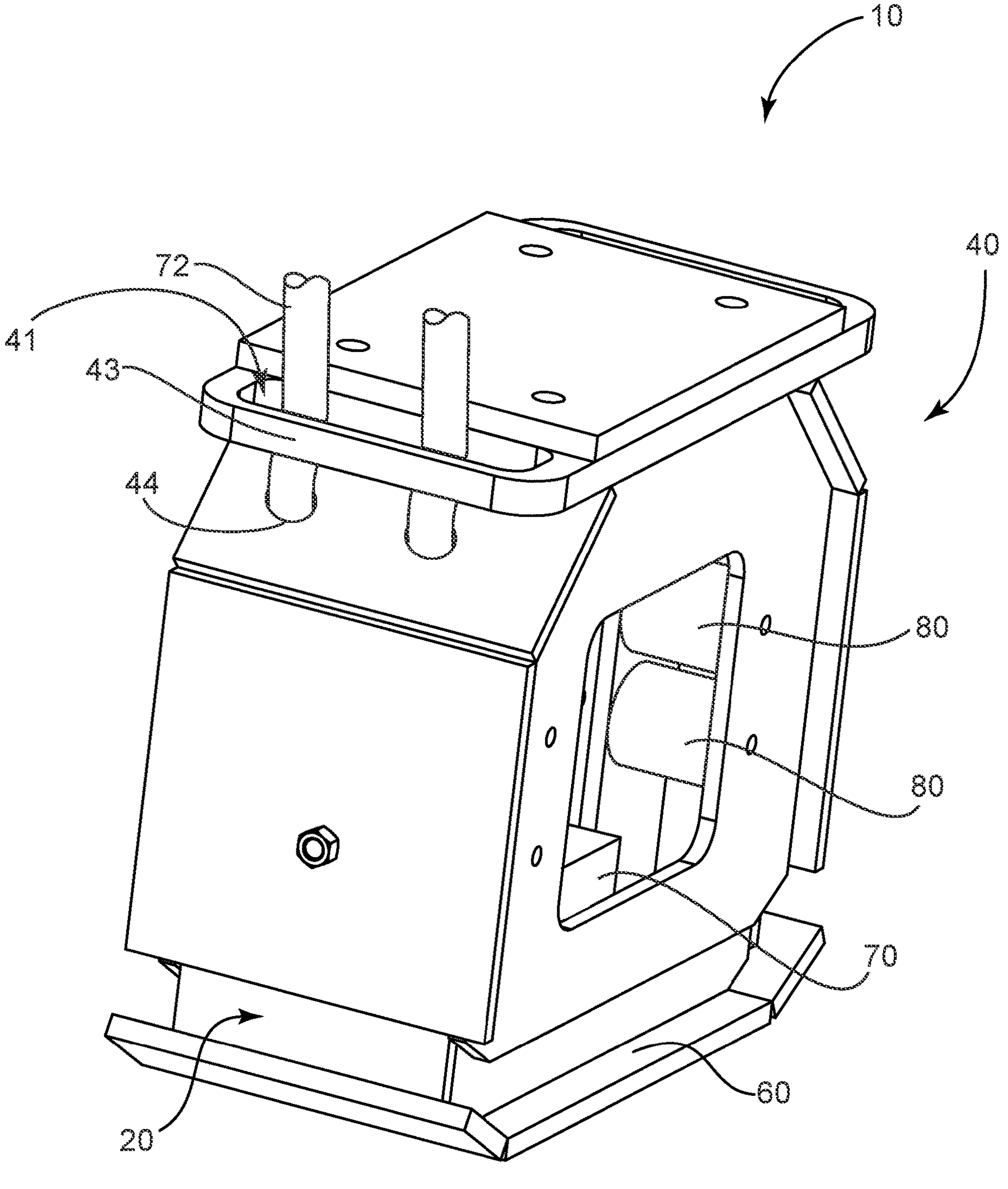
FIG. 1 is a perspective view of a vibratory compactor in accordance with an embodiment.
Figure 2:
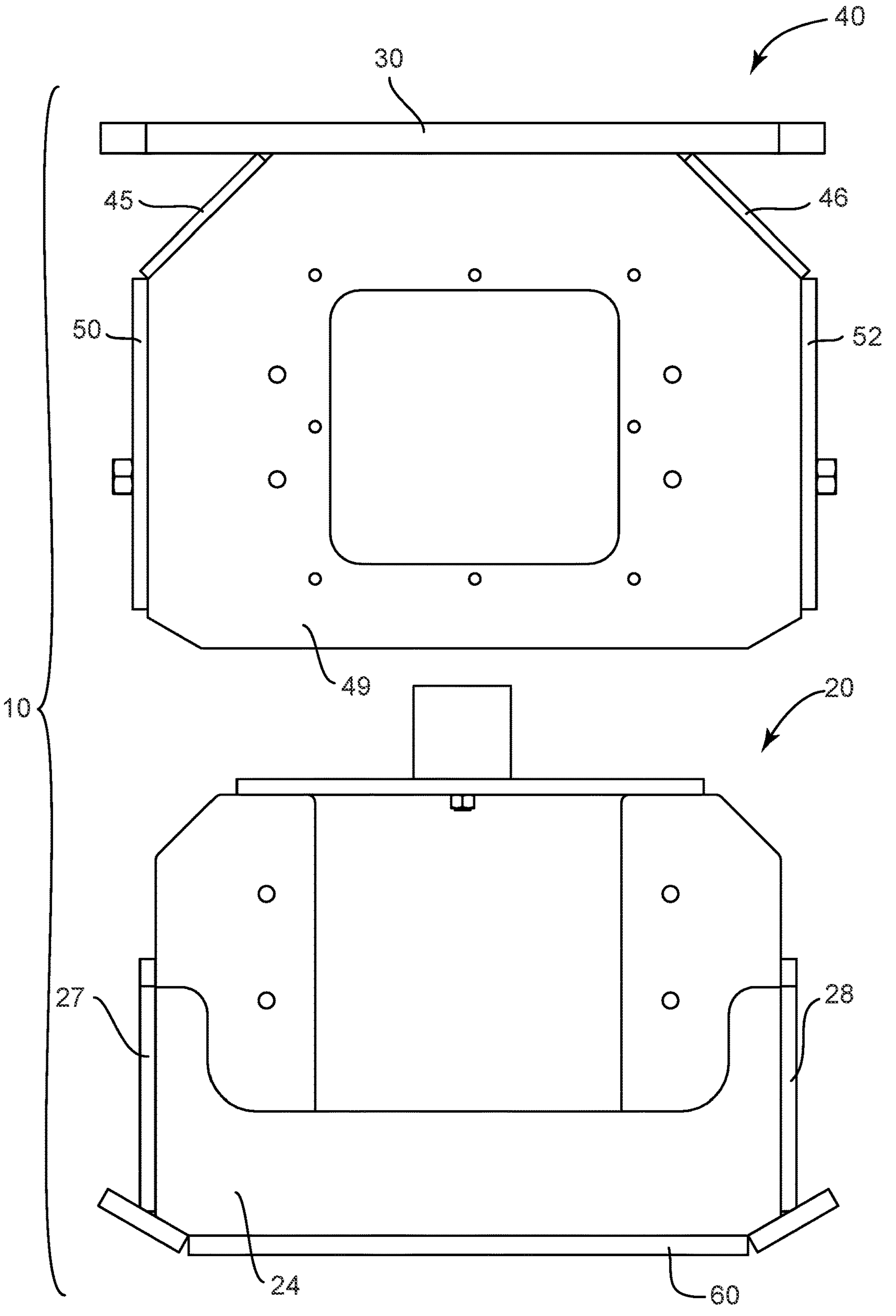
FIG. 2 is an exploded view of a vibratory compactor in accordance with an embodiment.
Figure 3:
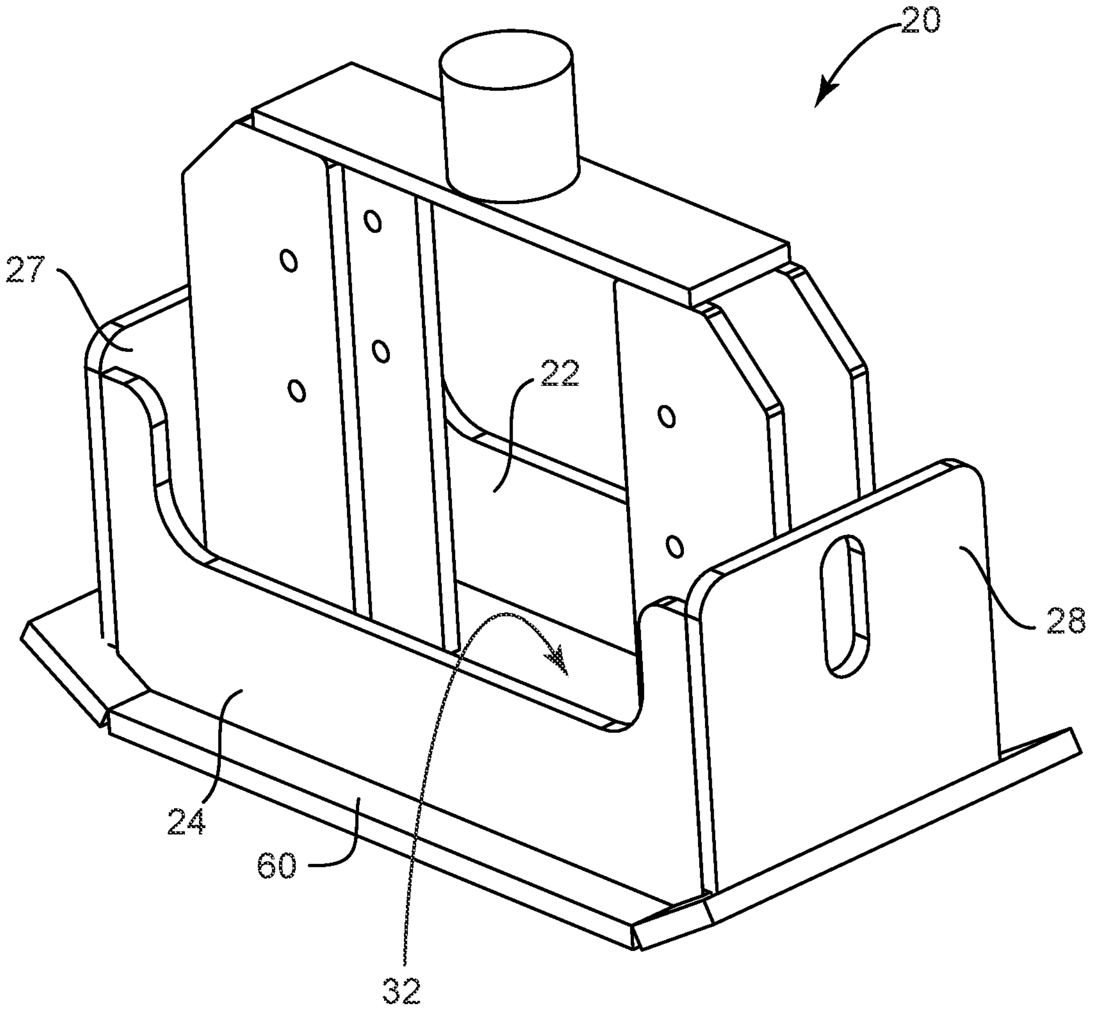
FIG. 3 is a perspective view of a frame of a vibratory compactor in accordance with an embodiment.
Figure 4:
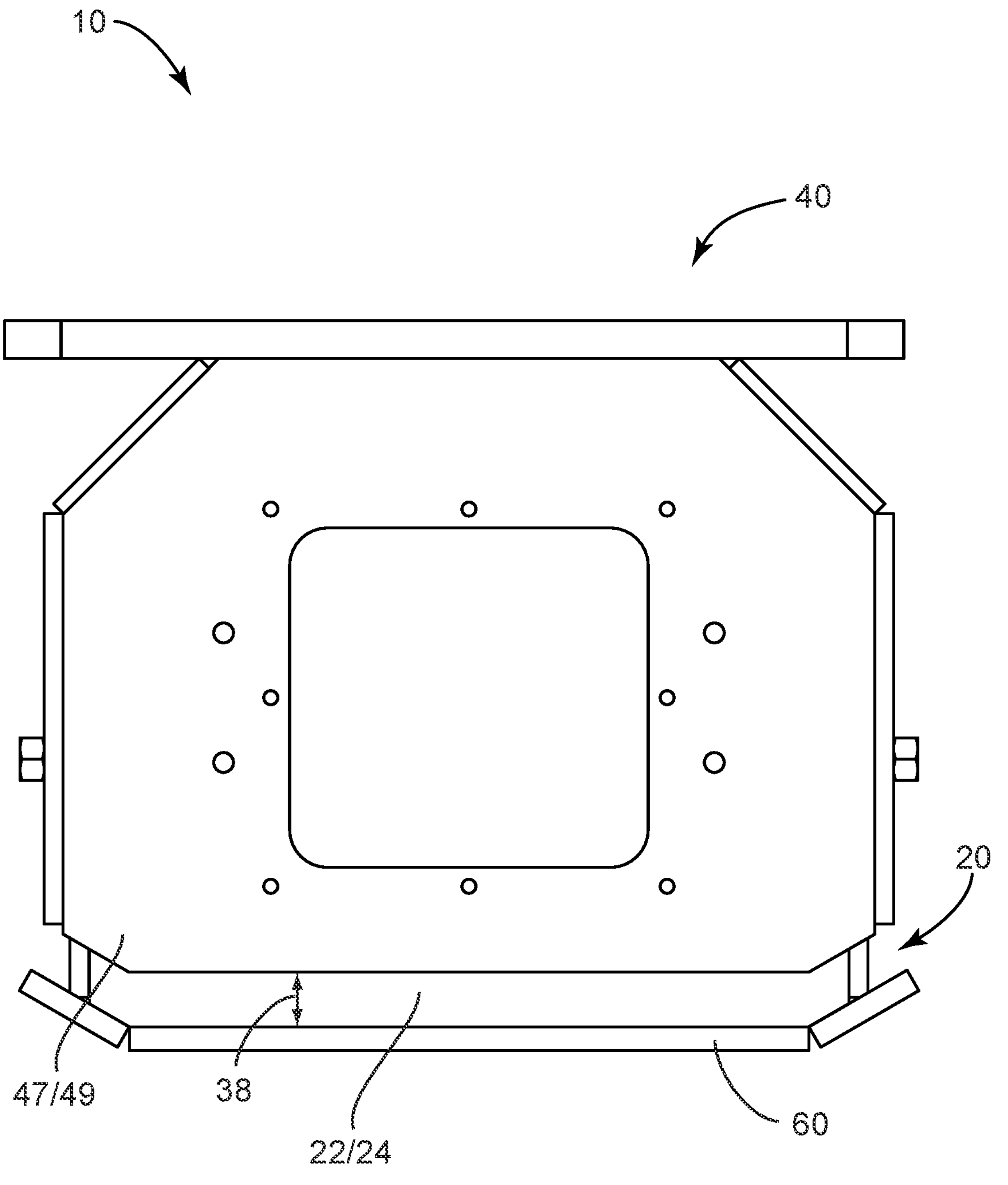
FIG. 4 is a side view of a vibratory compactor in accordance with an embodiment.
Figure 5:
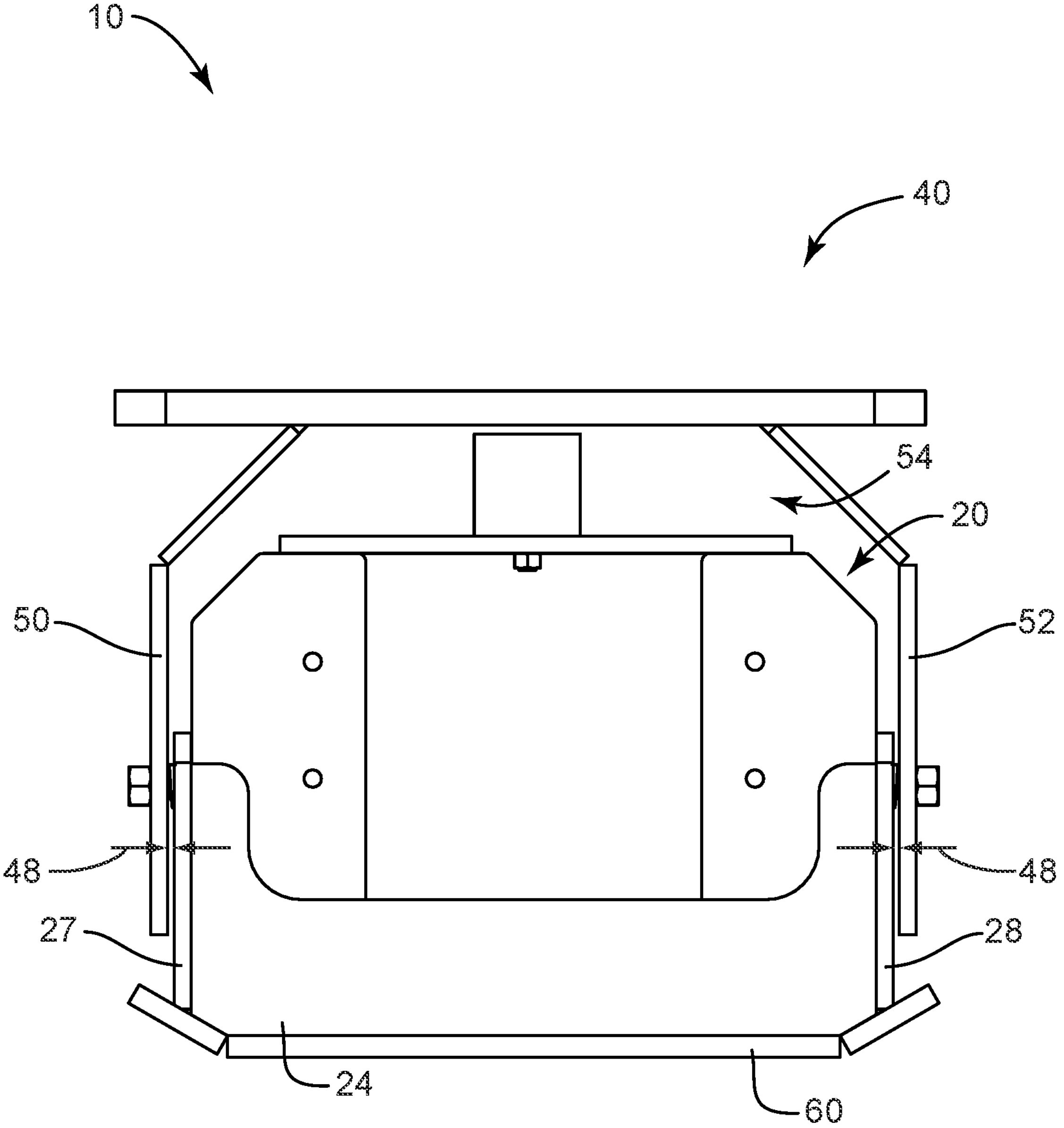
FIG. 5 is a side view of a vibratory compactor with a sidewall of a housing removed in accordance with an embodiment.

As discussed above, embodiments of the present invention relate to a vibratory compactor for use with an excavator type vehicle. An excavator type vehicle may be an excavator, a backhoe, a mini-excavator, or the like.

Referring to FIGS. 1-8, an embodiment of a vibratory compactor 10 is shown. The compactor 10 comprises a frame 20, a housing 40, a compactor plate 60 and a vibration generation device 70. The frame 20 comprises a first side member 22 spaced apart from a second side member 24 and a front member 28 spaced apart from a rear member 27, wherein the side members 22 and 24 with the front member 28 and the rear member 27 are coupled together to form a rectilinear inner space 32. The frame 20 may further comprise a plurality of mounting brackets 26 coupled between the first side member 22 and the second side member 24 and the between the front member 28 and the rear member 27. It will be understood that various amounts of mounting brackets 26 and orientations of coupling the mounting brackets 26 may be utilized. Further, it will be understood that the size and/or number of mounting brackets 26 utilized may correspond with the size of the vibratory compactor 10. The frame 20 may be coupled to the compactor plate 60. The vibration generation device 70 may be coupled to the compactor plate 60 within the inner space 32 of the frame 20. In embodiments, the vibration generation device 70 may be coupled directly to the compactor plate 60.

The housing 40 may include a top member 42, chamfered members 45 and 46, a first side member 47, a second side member 49, a rear member 50 and a front member 52 coupled together to form the housing 40 with an open end providing access to an inner volume 54. The opening and inner volume 54 are configured to receive the frame 20 within the inner volume 54 of the housing 40. All of the holes for coupling components to each may be tapped holes and comprise threads. This allows for coupling of components together without the need of nuts. For example, and without limitation, the top member 42 of the housing 40 includes various amounts of threaded holes that are configured to allow various sized couplers (ears) to be coupled to or bolted to the top member 42 without the need for nuts.

The vibratory compactor 10 may further comprise a plurality of isolators 80. Each isolator 80 may be coupled between the frame 20 on one end and to a side member 47 or 49 of the housing 40 on the other end. A portion of each isolator 80 is within the inner space 32 and a portion of each isolator 80 extends beyond edges of the first side member 22 and the second side member 24. The housing 40 may be coupled to the plurality of isolators 80, wherein the housing 40 comprises couplers 82 removably coupled to a top member 42 of the housing 40. The coupler 82 may be configured for coupling the vibratory compactor 10 to an excavator type vehicle (see FIGS. 9A-9C).

In embodiments, the vibration generation device 70 is a hydraulic vibration generation device. In these embodiments, the housing 40 may comprise apertures 44 configured for hydraulic hoses 72 to extend therethrough from the excavator type vehicle to the hydraulic vibration generation device 70. In other embodiments, the housing 40 may comprise fittings configured for hydraulic hoses to extend between the excavator type vehicle and one side of the fittings and configured for hydraulic hoses 72 to extend between an opposed side of the fittings and the hydraulic vibration generation device 70. The fittings may be located in the same place as the apertures 44. For example, the fittings may be coupled within the apertures 44.

In each of these embodiments, the apertures 44 are located toward a top of the housing 40 and not extending out of any of the sides of the housing 40. For example, the apertures 44 may be located in one of the upper chamfered members 45 or 46. The apertures located toward a top of the housing and not extending from the side, limits the opportunity for damage to the hoses or fittings. This is a distinction over prior art wherein prior art has hoses and fittings open to the environment and allows for damage to easily occur to the hoses and/or fittings. In embodiments of this invention, the fittings for hoses to the vibration generation device 70 are located within the inner space 32 of the frame 20 and the apertures 44 with or without fittings are located in an upper surface that limits damage that may occur during use. The configuration of the frame 20 and the housing 40 operate to protect the hoses 72 and fittings for operation of the vibration generation device 70. Additionally, the top member 42 of the housing 40 may include handles 43. The handles 43 operate to lift the housing 40 for coupling to the frame 20 and to lift the vibratory compactor 10 if needed. Further still, the hoses 72 may extend from the apertures 44 and through the handle opening 41 and serves as a further protection from damage to the hoses 72 during operation of the vibratory compactor 10 (see FIG. 1).

With additional reference to the isolators 80, the plurality of isolators 80 isolate the vibration of the compactor plate 60 and frame 20 from the housing 40. Additionally, the plurality of isolators 80 are oriented to allow forces to be applied to vibratory compactor 10 from operation of the excavator type vehicle in one or more directions comprising perpendicular to the compactor plate 60 and any angle to the compactor plate 60. As shown, the isolators 80 may be cylindrical in shape and more than one isolator may be coupled to the frame 20 and the housing 40, such as coupled to the mounting bracket 26 and the housing 40. The vibratory compactor 10 may further comprise a gap 48 between the housing 40 and the frame 20 and the housing 40. For example and referring to FIGS. 5 and 7, the gap 48 is formed between the first side member 47 of the housing 40 and the first side member 22 of the frame 20; between the second side member 49 of the housing 40 and the second side member 24 of the frame 20; between the rear member 50 of the housing 40 and the rear member 27 of the frame 20; and between the front member 52 of the housing 40 and the front member 28 of the frame 20. The gap 48 allows for movement between the housing and the frame and the isolators operate to dampen the movement of the housing 40 during vibration of the plate 60 and the frame 20 when the vibratory compactor 10 is operating.

Figure 6:
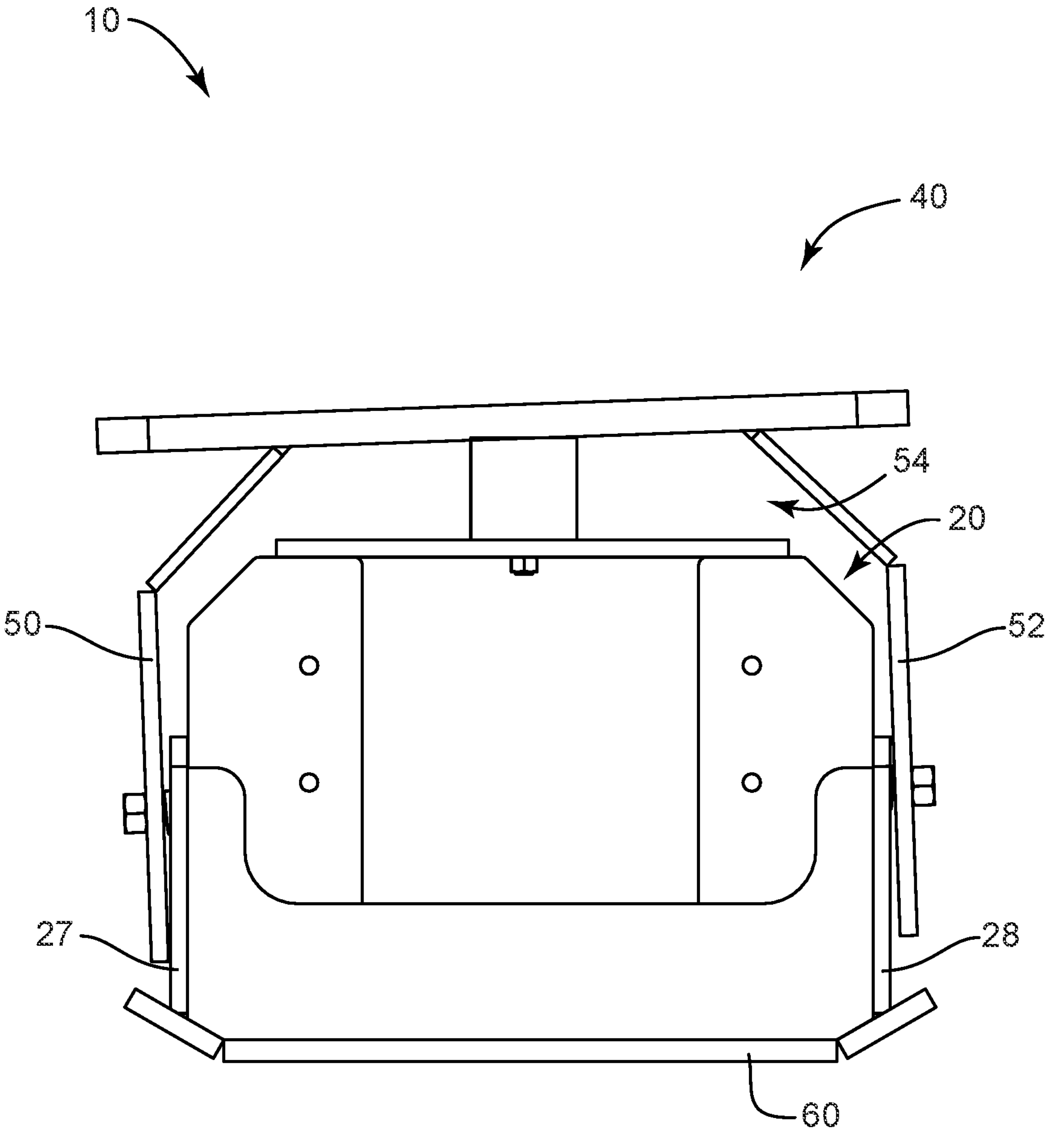
FIG. 6 is a side view of a vibratory compactor with a sidewall of a housing removed and excess forces applied in accordance with an embodiment.
Figure 7:
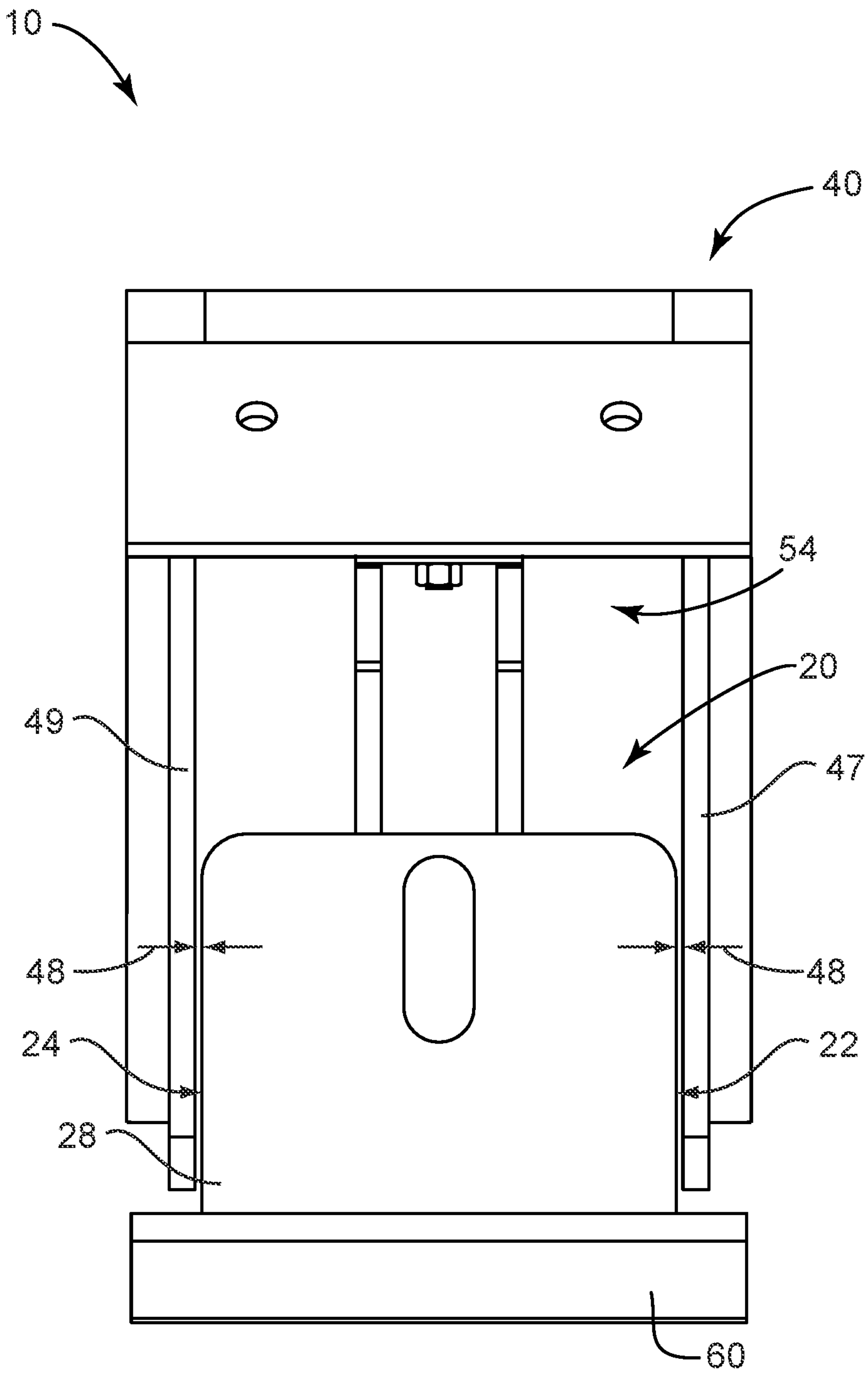
FIG. 7 is an end view of a vibratory compactor with a rear member of a housing removed in accordance with an embodiment.
Figure 8:
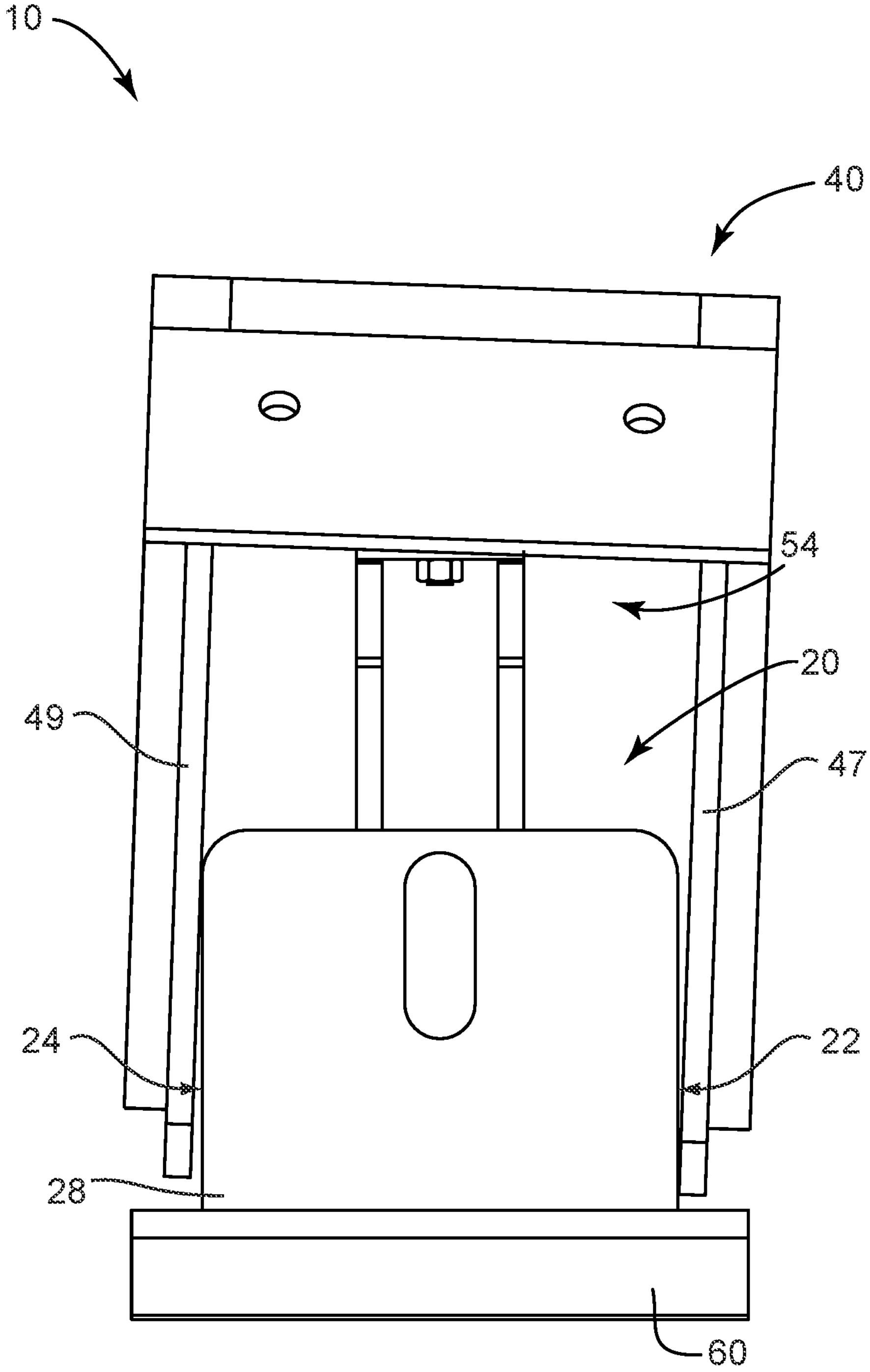
FIG. 8 is an end view of a vibratory compactor with a rear member of a housing removed and excess forces applied in accordance with an embodiment.

Additionally, the vibratory compactor 10 may further comprise a range of deflection of the plurality of isolators 80, wherein the range of deflection is defined by the distance of the gap 48 between the housing 40 and the frame 20 and the gap 38 between the housing 40 and the compactor plate 60, wherein limits of the range of deflection are set by the housing 40 contacting the frame 20 as shown in FIGS. 6 and 8. This may occur when excess forces are applied to the housing 40 in an up/down direction, a forward/backward direction, a side-to-side direction, or combinations thereof.

Figure 9A:
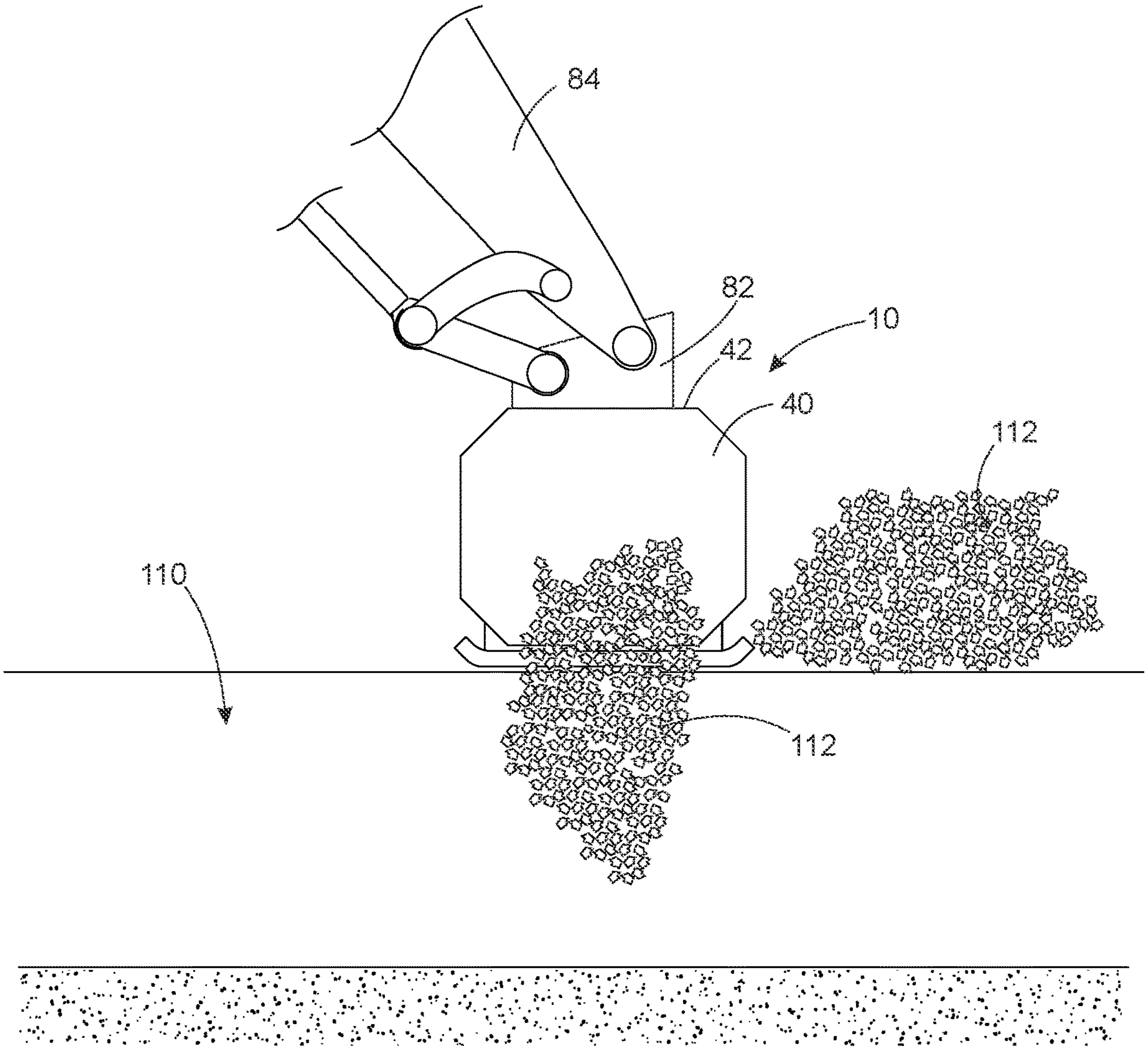
FIG. 9A is a side view of a ditch with a vibratory compactor moving material from a side of the ditch into the ditch in accordance with an embodiment.
Figure 9B:
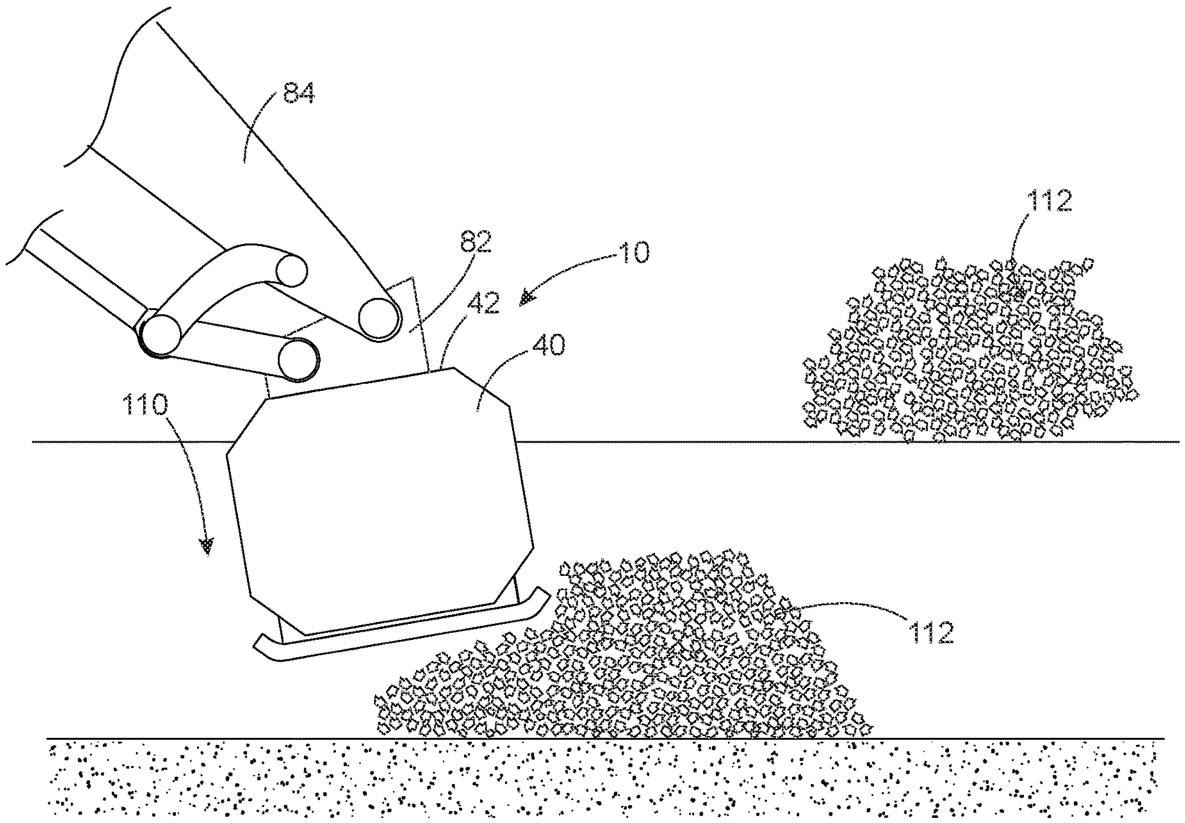
FIG. 9B is a side view of a ditch with a vibratory compactor moving material within the ditch in accordance with an embodiment.
Figure 9C:
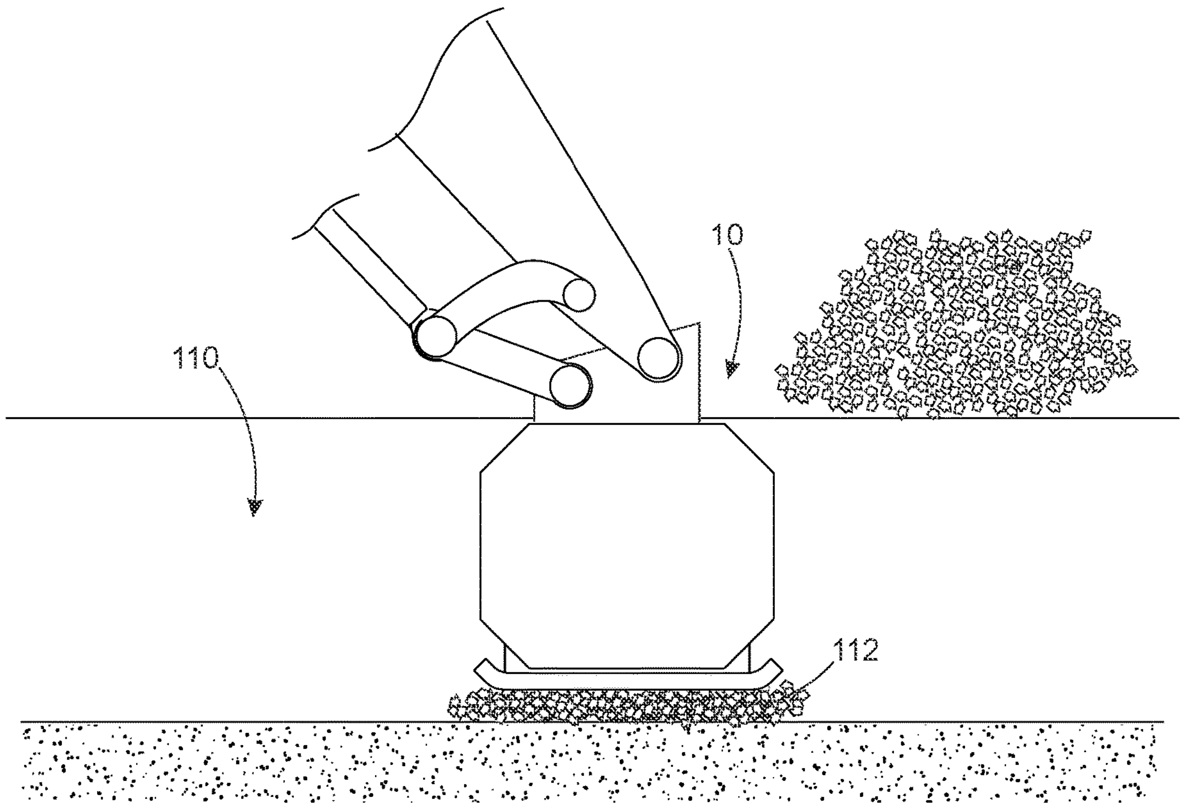
FIG. 9C is a side view of a ditch with a vibratory compactor compacting material within the ditch in accordance with an embodiment.

With further reference to FIGS. 9A-9C, the method of use may include moving material 112 from a first location to a second location, moving material in the second location and compacting material in the second location. A typical example of this is back filling and leveling a ditch that has rocky material within it. For example, and without limitation, a first location may be a side of a ditch 110 to a second location within the ditch 110 with the vibratory compactor 10 as shown in FIG. 9A; moving material within the ditch 110 with the vibratory compactor 10 as shown in FIG. 9B; and compacting the material 112 within the ditch 110 as depicted in FIG. 9C. In each instance the vibratory compactor 10 may utilize couplers 82 to couple to an arm 84 of an excavator type vehicle and operate to move or scrape material from a side of the ditch 110 into the ditch 110, move material within the ditch 110 and compact the material within the ditch 110. Conventional compactors do not have the ability to perform either of these functions because the hoses, fittings and motor are all exposed and subject to damage just by trying to compact within the ditch 110 and would definitely lack the ability to scrape material into the ditch.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A vibratory compactor comprising:

a frame coupled to a compactor plate, wherein the frame and compactor plate are configured to vibrate;

a housing comprising a first side member, a second side member, a rear member, a front member and an inner volume, the housing coupled to the frame by at least one isolator with the frame located within the inner volume of the housing, wherein the housing is configured to couple to an arm of an excavator; and a gap between the housing and the frame, wherein the gap between the housing and the frame sets a limit of a range of deflection of the at least one isolator by the housing contacting the frame when excess forces are applied to the housing in a forward/backward direction, a side-to-side direction, or combinations thereof.

2. The vibratory compactor of claim 1, wherein the at least one isolator isolates the vibration of the compactor plate and frame from the housing.

3. A method of use of a vibratory compactor comprising:

coupling a vibratory compactor to an excavator, the vibratory compactor comprising:

a frame coupled to a compactor plate;

a housing comprising a first side member, a second side member, a rear member, a front member and an inner volume, the housing coupled to the frame by at least one isolator with the frame located within the inner volume of the housing, wherein the housing is configured to couple to an arm of an excavator; and a gap between the housing and the frame;

applying an excess force to the housing in a forward/backward direction, a side-to-side direction, or combinations thereof; and inhibiting movement of the housing with respect to the frame through the housing contacting the frame in response to the compactor plate or frame being restricted while moving the vibratory compactor in the forward/backward direction, the side-to-side direction, or combinations thereof, the movement of the housing with respect to the frame being limited by a size of the gap between the housing and the frame.

4. The method of claim 3, further comprising preventing damage to the at least one isolator in response to inhibiting movement of the housing with respect to the frame.

* * * * *